United States Patent
Daly et al.

(10) Patent No.: US 8,650,298 B2
(45) Date of Patent: Feb. 11, 2014

(54) RESOURCE ALLOCATION SYSTEM

(75) Inventors: Edmond James Daly, Kilmallock (IE); David Ronan, Gorey (IE); Cronan McNamara, Glasnevin (IE)

(73) Assignee: Creme Software Limited, Dublin (IE)

( * ) Notice: Subject to any disclaimer, the term of this patent is extended or adjusted under 35 U.S.C. 154(b) by 144 days.

(21) Appl. No.: 12/959,848

(22) Filed: Dec. 3, 2010

(65) Prior Publication Data

US 2011/0138055 A1    Jun. 9, 2011

(30) Foreign Application Priority Data

Dec. 4, 2009 (GB) ............................. GB0921289.5

(51) Int. Cl.
*G06F 15/173* (2006.01)

(52) U.S. Cl.
USPC ...................................................... 709/226

(58) Field of Classification Search
None
See application file for complete search history.

(56) References Cited

U.S. PATENT DOCUMENTS

| | | | |
|---|---|---|---|
| 7,137,119 B1 * | 11/2006 | Sankaranarayan et al. ... | 718/103 |
| 7,996,847 B2 * | 8/2011 | Wong et al. ................... | 718/104 |
| 2005/0044228 A1 * | 2/2005 | Birkestrand et al. .......... | 709/226 |
| 2006/0069621 A1 * | 3/2006 | Chang et al. ................... | 705/26 |
| 2006/0212332 A1 * | 9/2006 | Jackson ............................ | 705/8 |
| 2006/0227810 A1 * | 10/2006 | Childress et al. ............. | 370/477 |
| 2007/0078960 A1 * | 4/2007 | Dawson et al. ............... | 709/223 |
| 2007/0106994 A1 | 5/2007 | Jackson | |
| 2007/0143220 A1 * | 6/2007 | Ajiro ............................... | 705/52 |
| 2007/0143765 A1 * | 6/2007 | Aridor et al. .................. | 718/104 |
| 2008/0115143 A1 * | 5/2008 | Shimizu et al. ............... | 718/105 |
| 2008/0249757 A1 | 10/2008 | Berstis et al. | |
| 2008/0263559 A1 * | 10/2008 | Das et al. ....................... | 718/104 |
| 2008/0300844 A1 * | 12/2008 | Bagchi et al. .................. | 703/13 |
| 2009/0031312 A1 | 1/2009 | Mausolf et al. | |
| 2009/0077559 A1 | 3/2009 | Tajima | |
| 2009/0254660 A1 * | 10/2009 | Hanson et al. ................ | 709/226 |
| 2011/0312613 A1 * | 12/2011 | Battersby et al. ............... | 506/23 |

FOREIGN PATENT DOCUMENTS

| | | |
|---|---|---|
| GB | 0921289.5 | 3/2010 |
| JP | 9160890 | 6/1997 |
| JP | 9265459 | 10/1997 |

* cited by examiner

*Primary Examiner* — Chirag Shah
*Assistant Examiner* — Rina Pancholi
(74) *Attorney, Agent, or Firm* — Charles A. Lemaire; Jonathan M. Rixen; Lemaire Patent Law Firm, P.L.L.C.

(57) ABSTRACT

The present application provides a scalable system for managing requests for compute resources using a cloud computing architecture. The system estimates the total processing time of each computation in advance and monitors the progress of each computation to provide a more accurate estimate of remaining processing time. In this way, a determination may be made as each new computation request is received as to whether an additional resource is required or whether an existing resource would be suitable.

22 Claims, 5 Drawing Sheets

RESOURCE ALLOCATION SYSTEM

CROSS-REFERENCE TO RELATED APPLICATIONS

This application claims priority benefit under 35 U.S.C. §119(a) to Great Britain Patent Application GB0921289.5 filed on 4 Dec. 2009 by Edmond James Daly et al., titled "A RESOURCE ALLOCATION SYSTEM", which is incorporated herein by reference in its entirety.

FIELD

The present application relates to the field of computers and more particularly to systems and methods for allocating computer resources in a cloud computing environment.

BACKGROUND

The present application is directed to resource intensive computations which take a large amount of computing resources and time to complete. In such resource intensive computations, the time required is prohibitively long to be performed on a standard desktop PC.

High performance parallel computing methods have been developed to address this problem. Under these methods, the computation is expedited by running the computation in parallel over many processors at the same time rather than in a serial fashion on one processor. Grid computing is an example of such a method. Grid computing was designed for use with large scale, resource intensive scientific applications such as the SETI (Search for Extra Terrestrial Intelligence) programs. The concept was that computers (nodes) not currently doing tasks could be allocated a task as part of a larger job. Grid computing is a form of distributed computing whereby resources of many computers in a network are used at the same time, to solve a single problem. Grid systems are designed for collaborative sharing of resources. It may also be thought of as distributed and large-scale cluster computing. Grid computing is making big contributions to scientific research, helping scientists around the world to analyze and store massive amounts of data by sharing computing resources. One important concern for users and operators of such systems is how jobs should be queued. Thus for example in the distributed computing present in a grid computing environment, techniques are known for the allocation of tasks to computing resources. Conventionally such environments include an estimate of the likely time/resources required by a task. Thus for example in U.S. Patent Publication 2007/0106994 a determination of a completion time for a received request is obtained and from this determination resources are reserved. The method provides for analysis of a request which requires more than one resource and determines different times for each resource and reserves resources accordingly. Similarly in U.S. Patent Publication 2007/0078960 performance data is collected periodically from resources in a grid computing environment and stored in a content-addressable data repository from where analyses may be performed and the results communicated to a grid workload agent to improve grid management on a fine-grained basis. In another approach in U.S. Patent Publication 2008/0115143, as a job is being executed on a computer its percentage completion of tasks is monitored. From this an estimate of completion time for a job is made. Where this completion time does not meet the requirements for a job, the job is divided into tasks to be left on the computer and tasks to be transferred to another computer.

A newer development to grids is the concept of cloud computing. Cloud computing is the use of a third party service (Web Services) to perform computing needs. With cloud computing, companies can scale up to massive capacities in an instant without having to invest in new infrastructure. Cloud computing is of benefit to small and medium-sized businesses. Basically consumers use what they need on the Internet and pay only for what they use. Cloud computing eliminates the costs and complexity of buying, configuring, and managing the hardware and software needed to build and deploy internet delivered applications.

The present application is directed to a system in which resources are allocated in a cloud environment.

For the purposes of explanation, the application will now be described with reference to a service provided by the Assignee of the present application. This service provides a web accessible computation service that allows clients to log on to an account using a web browser and then to create a request combining data and analyses to be performed. Once a client has uploaded their data and analyses to be performed, the system utilizes high performance computing to perform the intensive computations quickly and efficiently.

Once the computations have been completed, the user can retrieve their data using their web browser. The service is continuously accessible to the users (24 hours a day, 365 days a year) through any web browser. It will be appreciated that with such a service, the loads on the system are unpredictable. For example, at one time there may be no compute resource required and at another time a large amount of compute resource may be required.

The traditional high performance computing model known heretofore required the purchase of a fixed resource (or setting up a computing system of a certain size). Requests can then be made to the system for computing resources. The requests can include requirements for a certain amount of compute resource and different requests can have different priorities. Once the compute resource of the total system is fully utilized then any additional requests for resources are queued until the resources to execute that request become available.

Cloud computing offers advantages over this fixed resource approach. In cloud computing, as will be familiar to those skilled in the art, computing resources may be requested from a cloud on a need basis rather than dedicating a machine to a particular service. It will be appreciated that this has a number of advantages including cost and also provides an environmental advantage by sharing computing resources to maximize efficiency rather than having computing resources lying idle for long periods of time consuming energy.

There are a number of companies making cloud computing services available on a commercial basis including for example, Amazon (EC2 service), IBM (IBM Blue Cloud) and Microsoft (Windows Azure). These services have made scalable computing resources available. New compute instances or compute nodes may be created and removed as required by a system, allowing a scalable system to be developed. Each of these services will have a system managing the cloud allocating and de-allocating computing instances in response to user requests. The present application is not directed at the management of the cloud.

Where a new compute instance is required in a cloud, typically, it may take 2-5 minutes to create. Additionally, there is a minimum amount of time that a computer instance may be requested for. This is referred to as the minimum request-able time (MRT). For example on Amazon EC2, this MRT is one hour.

In addition, there are different types of compute resources available in cloud computing services known heretofore. For example, the instance types that are currently available on Amazon EC2 may include the following which is given by way of example only and is not intended to be an exhaustive list:

Small Instance (Default) 1.7 GB of memory, 1 EC2 Compute Unit (1 virtual core with 1 EC2 Compute Unit), 160 GB of instance storage, 32-bit platform, $0.095/hr Large Instance 7.5 GB of memory, 4 EC2 Compute Units (2 virtual cores with 2 EC2 Compute Units each), 850 GB of instance storage, 64-bit platform, $0.38/hr Extra Large Instance 15 GB of memory, 8 EC2 Compute Units (4 virtual cores with 2 EC2 Compute Units each), 1690 GB of instance storage, 64-bit platform, $0.76/hr High-CPU Medium Instance 1.7 GB of memory, 5 EC2 Compute Units (2 virtual cores with 2.5 EC2 Compute Units each), 350 GB of instance storage, 32-bit platform, $0.19/hr High-CPU Extra Large Instance 7 GB of memory, 20 EC2 Compute Units (8 virtual cores with 2.5 EC2 Compute Units each), 1690 GB of instance storage, 64-bit platform, $0.76/hr With the commercial cloud computing resources available, for a system which is small (relatively speaking) in comparison with the available cloud, there is a virtually limitless computing resource available to a customer requesting instances in the cloud. One of the problems which this application addresses is how to utilize this resource efficiently under an unpredictable load. It will be appreciated that this problem is entirely different to the aforementioned grid computing method where the grid resources are limited and with respect to the size of the tasks being performed. Similarly, it will be appreciated that the problem is not the same as managing the overall operation of the cloud.

One solution to the general problem might be to simply create a new computing instance each time a request for compute resource arises. However, it will be appreciated that this approach would be naive and inefficient since there may already be resources available within the allocated resources to handle the request.

There is therefore a need for system for managing resources obtained from a cloud computing environment which addresses at least some of the problems of the prior art.

SUMMARY

The present application provides a scalable system for managing requests for compute resources using a cloud computing architecture. The system estimates the total processing time of each computation in advance and monitors the progress of each computation to provide a more accurate estimate of remaining processing time. In this way, a determination may be made as each new computation request is received as to whether an additional resource is required or whether an existing resource would be suitable.

In a first embodiment, a system is provided for managing computing resources obtained from a cloud computing environment. The system is configured to allocate one or more computational requests received from one or more users to one or more computing resources of the cloud. To achieve this, the system comprises an interface configured to receive the computational requests from the one or more users, an estimator configured to estimate the time required to perform the received computational request if allocated to a computing resource, a feedback module receiving feedback data from existing resources of the cloud as to their availability, the feedback data including an estimate of the time remaining for each computing resource to complete a computational request currently assigned to them. The system is configured to obtain an acceptable wait time for a received computational request and determine whether the received computational request will have to wait longer than the obtained acceptable wait time based on the feedback from existing resources of how long a computation request will have to wait for an existing resource to become available and where such a determination is made obtain at least one further resource from the cloud. Suitably, the system is configured to allocate resources by placing the received computational request in a queue until an existing resource assigned in the cloud computing environment to the system becomes available. The system may further comprise a database, the database being configured to store the estimates received from resources by the feedback module. The database may be configured to also store information regarding the availability of computing resources to the system. The system may be further configured to store the determined estimate as the computational request is allocated to a computing resource. The data for individual computing resources is suitably updated based on the feedback data received from the feedback module. The estimator may be suitably configured to determine the estimate using at least two partial estimates which are aggregated together, in which case the feedback module may receive feedback data on each of the partial estimates. One of the partial estimates may comprise an initialization estimate, the initialization estimate providing an estimate of the time required to initialize the computing resource to perform the allocated request. Another one of the partial estimates may comprise a finalization estimate, the finalization estimate providing an estimate of the time required after a computing resource has completed a task to store the result data. Yet a further one of the partial estimates may comprise an iteration estimate, wherein the partial estimate for the iteration estimate is calculated by determining the number of iterations required to complete the request and the time required to complete each iteration. The estimator may be configured to determine the estimate of time required to perform the computational request by reference to times taken to complete previous computational requests. Suitably, the determination of the estimate determines the estimate based on the values of identified parameters of the calculation and where the estimate extrapolates the estimate from the values of parameters and the time taken for previous computational requests.

A second embodiment provides an instance in a cloud computing environment, where the instance is configured by a server outside the cloud, the instance being configured to perform a task comprising calculations received from the server, wherein the instance is configured to calculate an estimate of the time remaining for performance of the task, and where the instance comprises a feedback module for providing the calculated estimates to the server. The instance may be configured to provide the calculated estimates to the server by updating a database associated with the server. The instance may be configured when inactive to periodically check the database for an unallocated task. Each instance may have a predetermined lifetime corresponding to the minimum request-able time for an instance from the cloud and wherein the instance is configured if there is no unallocated task to return itself to the cloud when it is within a predetermined time of its lifetime. Suitably, the lifetime of an instance recommences if it is performing a task at the end of its lifetime. The instance may be configured to calculate the estimate as a series of partial estimates. This calculation may comprise at least one iterative calculation and the estimate includes an iterative estimate based on the number of iterations performed in the primary loop of said at least one iterative calculation. The at least one iterative calculation may comprise at least one sub-loop for performing an iterative calculation within each iteration of the primary loop. The iterative estimate is suitably updated as iterations are completed.

BRIEF DESCRIPTION OF THE DRAWINGS

The present application will now be described in greater detail with reference to the accompanying drawings in which.

DETAILED DESCRIPTION

Figure 1:
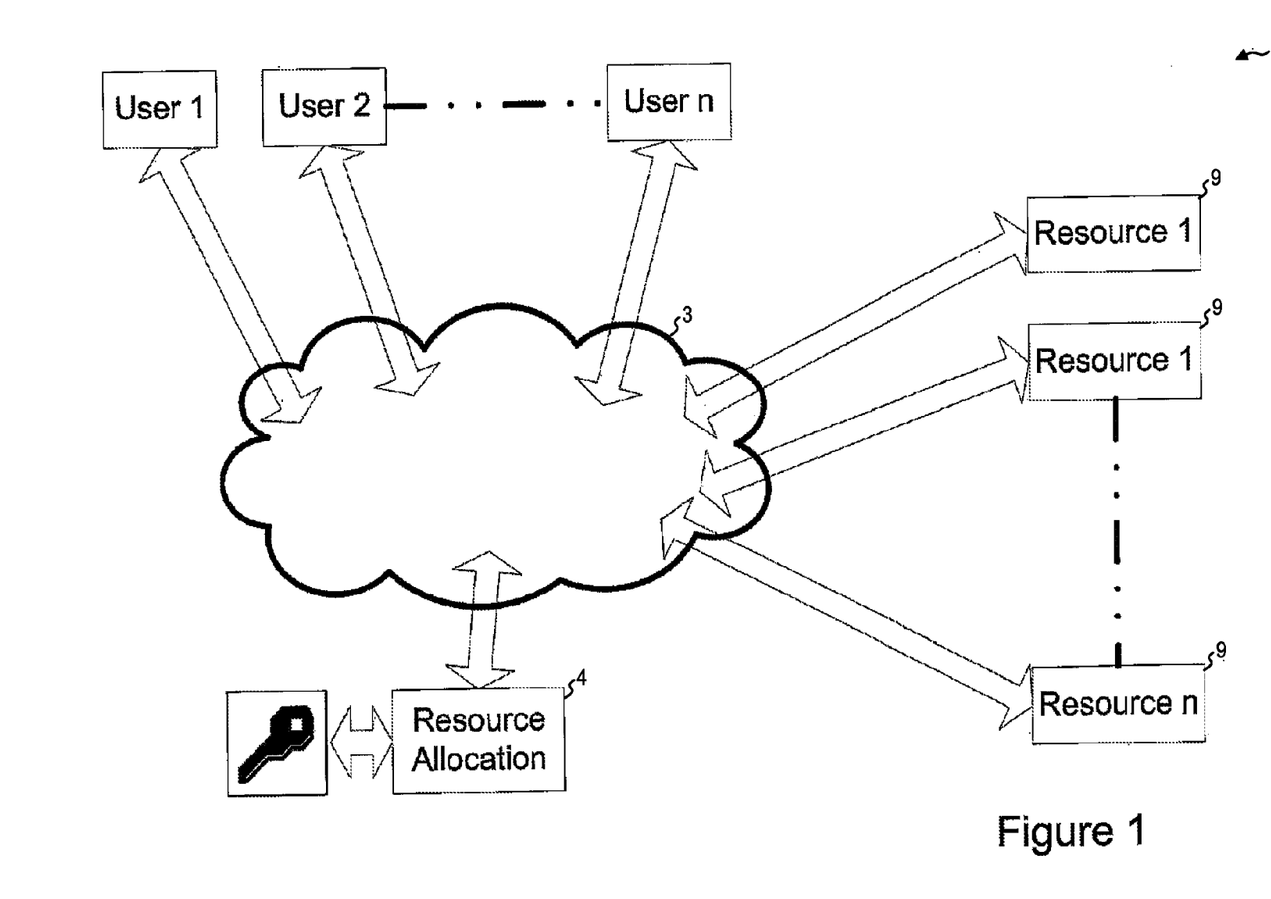
FIG. 1 is an example of an arrangement of a system suitable for implementing the present application.

The present application allows for the efficient allocation of resources within a cloud computing or similar environment where different computing resources are available in slots. In particular, the system 1 allows one or more users, as shown in FIG. 1, to submit computational requests to a resource allocation server 4. These requests may be submitted over a suitable network such as the Internet 3 using technology which would be familiar to those skilled in the art. The resource allocation server 4 which comprises one or more processors manages the allocation and re-allocation of computing resources 9 to computation requests received by users. The resource allocation server 4 will now be explained with reference to an exemplary service provided by the assignee. It will be appreciated that whilst the techniques described within this application for allocating resources are particularly suited to the service provided by the assignee, those skilled in the art will appreciate that it may be extended to other services.

Figure 2:
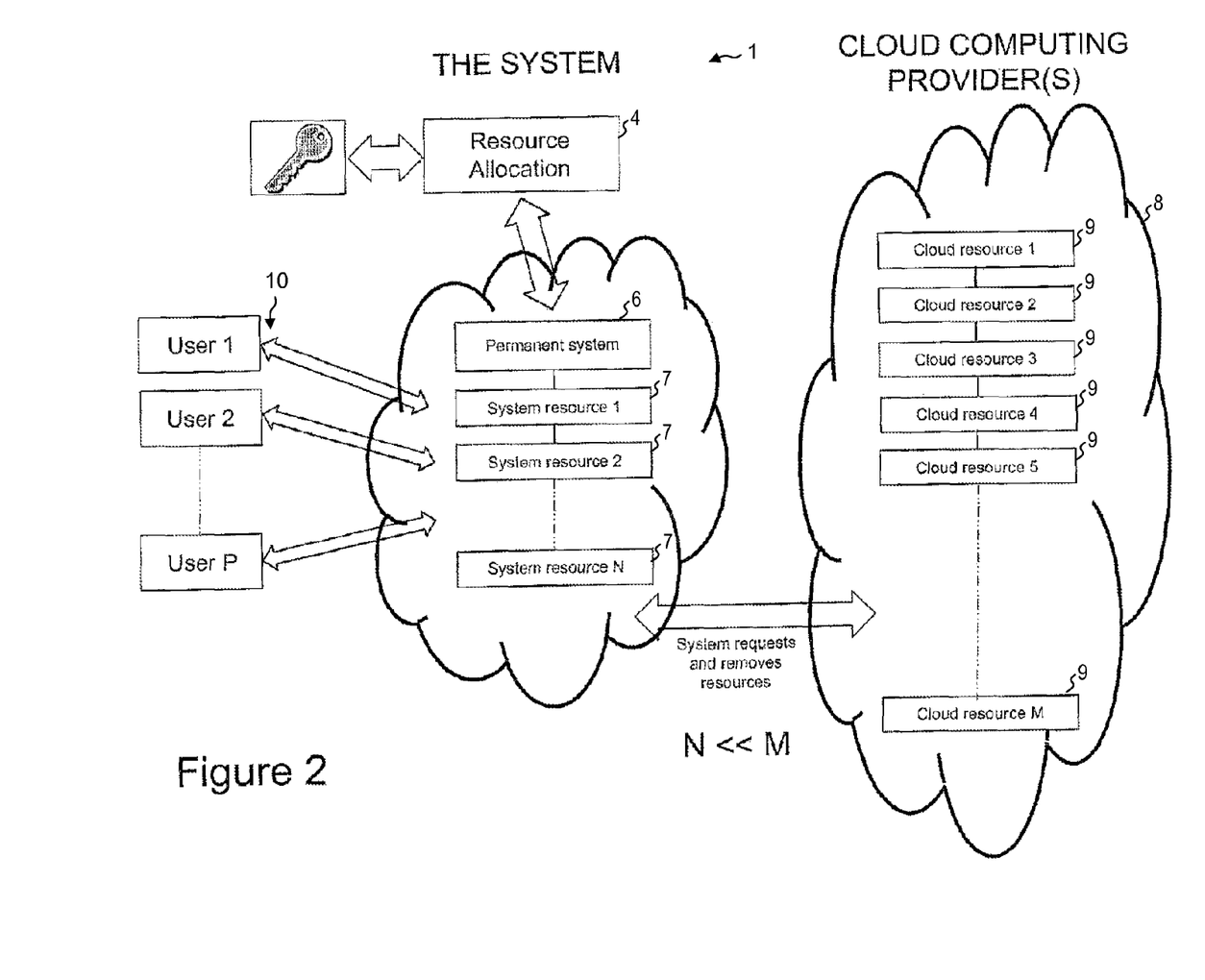
FIG. 2 is a more detailed view of the system of FIG. 1 illustrating its interaction with one or more cloud computing providers.

A more detailed schema of the arrangement is shown in FIG. 2, in which a plurality of users submit computational requests to the resource allocation system 1. The resource allocation system 1 comprises a permanent system 6 which suitably comprises a web server and database server. The permanent system 6 manages one or more temporary system resources 7. These temporary system resources 7 in turn are compute instances obtained from one or more cloud computing providers 8. It will be appreciated that the number of compute instances obtained by the system (N) from the cloud will be much less than the overall number of compute instances in the cloud (M). The permanent system 6 is configured to request, obtain and configure compute instances from the cloud providers 8 as demand increases. Similarly the permanent system 6 is configured to release compute instances back to cloud providers, for example, and generally speaking as demand falls. At any one instance, the system 1 managed by the resource allocation may comprise several compute instances obtained from a cloud. Some of these compute instances (cloud resources) may be active in the sense that they are completing a computation request submitted by a user, whereas other compute instances may be inactive in the sense that they are not performing a computation submitted by a user. Thus at the start, the system 1 may have no resources available for performing computational requests received by users. This would continue until a computational request is received by a user, whereupon the system 1 would request and obtain a resource 9 from the cloud. The resource 9 is typically obtained from the cloud provider 8 for a predetermined amount of time. Suitably the system 1 configures the obtained resource 9 and sets up the received computational request to run on the resource 9 once configured. It will be appreciated that the computational request may not require all of the predetermined amount of time in which the resource 9 has been allocated from the cloud. In such a situation, the resource 9 would become available for re-use by the system 1. It will be appreciated in this situation that the resource 9 is not returned to the cloud. The system 1 may release the resource 9 back to the cloud 8 if it is not required and the duration that has been used is close to the predetermined amount of time that was allocated. Each time a resource 9 is obtained from a cloud 8 a cost is incurred. It will be appreciated that the present system 1 is not concerned with the management of the cloud 8 itself and may for example obtain computing resources 9 from more than one cloud.

The exemplary service provided by the system 1 of the assignee has the facility to store, manipulate, and analyze very large data sets. Typically, a user employing the service would want to determine the risk characteristics relating to some particular mathematical model and some set of input data. The service deals primarily with Probabilistic Risk Analysis. The solution to many risk assessments often cannot be determined exactly, due to insufficient quantity or quality of input data (often called the data "variability" and "uncertainty" respectively). When there is insufficient data to exactly determine the quantities in question, a statistical analysis is required to determine a best estimate of the quantity, along with the likely accuracy of that estimate. The statistical methods used are usually very computationally intensive—due to the large size of the data sets, and the fact that accuracy is improved primarily by running the calculations for longer times (carrying out more "iterations" of the calculation).

In the exemplary service of the assignee, users access the system 1 providing the service using a web browser and logging in at the service website. Within the web interface 10, a facility is provided to allow users to view their data sets, and previous assessment results. Suitably the web interface 10 and system management are a permanent part of the system 1. Advantageously, users may also set up new assessments by selecting the relevant information needed to do so. Typically a user would begin by selecting a type of risk assessment from a predetermined list of types of assessments. A risk assessment is usually a mathematical model which it is assumed characterizes the system under consideration. The user suitably also selects the relevant statistics that are required from the output. Next, the user can select the set of data that is to be considered. Finally, the user may select some parameters which determine how the assessment is carried out computationally. It will be appreciated that the selections available for each of these options is largely under the control of the system operator as the nature of the parameters provided to the user is limited by the choices available to the user in the web interface 10. So whilst a user has freedom in determining the nature of the risk assessment, the input data and parameters associated with performing the assessment, it is the system that provides the code and functionality to actually carry out the assessment. This allows the system to include additional functionality when performing the assessment which is invisible to the user. This additional functionality will be explained below.

The type of assessment usually performed by users of the service consists of a series of weighted random samplings from the data set or probabilistic distributions. A final estimate may be determined by an averaging procedure, over each of these samples (also called "replications" or "iterations"). The user will generally specify the number of iterations that they require, for both "variable" and "uncertain" components of the data. It will be appreciated that the accuracy of any estimate will usually improve with further iterations, but so too will the computational time required. Typically, the accuracy of such calculations increases with the square root of the number of iterations, whereas the computational time increases linearly with the number of iterations. Once the model, data, and iterations required, have been fully specified by a user through the web interface 10, the system 1 allows them to use a means such as a HTML form to submit the assessment to the resource allocation server 4. It will be appreciated that the nature of the assessment is predetermined since the system operator is providing the interface which provides the user with the options in requesting the assessment.

The resource allocation server 4 receives individual assessment requests along with all the input parameters required to carry out each request. On receiving a request, the allocation server 4 performs an initial review of the assessment request to make an initial estimate as to the expected time that will be required to fully carry out the request (called the "Analysis Time of Computations", ATC). This estimate is made using a predetermined relationship between the input parameters (type of model, size of data, iterations selected, etc. . . . ). It will be appreciated that the method of performing the initial estimate may vary depending on the nature of the calculations. In the exemplary system of the assignee, the initial estimate is determined using a regression fit of the input parameters, to the recorded run times of previous assessments. It will be appreciated that the use of such an approach ensures the accuracy of this estimate improves as more assessments are carried out, as these running times provide further data to the regression. Moreover, it will be appreciated that this is possible because the service operator has predefined knowledge of the nature of the possible input parameters. In contrast, in a cloud computing environment generally the cloud manager has no knowledge of the time actually required by a user and instead simply allocates resources from within the cloud for predetermined time periods, for example, 1 hour.

In the exemplary system of the assignee, the processing of each individual assessment may be broken down into different stages. Accordingly, the calculation of the ATC may be best described and calculated in three distinct parts—"initialization", "iterations", and "finalization". It will be appreciated that in other systems it may be more appropriate to break the calculation into more or less parts.

In the exemplary system of the assignee, the first part of the service is directed to the initialization of the assessment. The start time of every assessment is logged in a system database. During initialization, the data that is required for the assessment is transferred from a database (typically on a dedicated database server associated with the system) to the instance 9 in the cloud 8 performing the assessment. At the same time, any required output database tables may be created and initialized. It will be appreciated that by logging the time taken to perform different initializations, a reasonable estimate may be determined of how long a particular assessment might take using a regression based approach with the input parameters for the assessment.

The second 'iterations' stage is the main probabilistic part of the assessment. The start time of this "iterations" stage is also logged in a system database, which gives an implicit measure of the duration of the initialization phase of each recorded assessment. During the 'iterations' stage, the calculation iterates over all the "uncertain" variables—each iteration consisting of a weighted random sampling of the data set. Within each of the outer/"uncertainty" iterations, there is an inner loop of iterations, each of which consists of random sampling of parameters relating to data set "variability".

The model in question is applied at each iteration, and the results are stored for later analysis. Each inner iteration requires roughly the same amount of time. Furthermore, each outer iteration consists of an equal number of inner iterations. The progress of this part of the calculation can therefore be determined by the number of inner/outer iterations that have been completed, relative to the number that are required. By maintaining a count of the position of the calculation in the inner and outer iterations, it is possible to determine the amount of time left based on the time spent on the iterations already.

For example, if the assessment requires 100 outer iterations and 1000 inner iterations (per outer iteration), then after 25 outer and 300 inner iterations have been completed, it may be estimated that this part of the assessment is 25.3% complete.

In the 'finalization' part of the assessment, the information from each of the iterations is collated and various statistics are calculated. These statistics and any further output data are transferred to the database server. Once the results have been transferred, the user may be sent a notification that the assessment is complete. The user may then retrieve and examine the results through the web interface 10. The end time of the assessment, along with the total running time, is also logged. The user is generally oblivious to how and where the analysis was performed.

The service provided by the assignee allows for the parallelization of computations over processors with shared memory using Pthreads and OpenMP and also over servers using MPI. This means that the service may take advantage of multiple processors within a server with shared memory plus multiple servers with distributed memory. Moreover, the structured nature of the service provided means that compute speed scales close to linearly with the addition of processors and/or servers (of equal capacity).

Although the service described above is a specific type of computational analysis, the methods of allocating resources described here are applicable to any similar computational task which may be assigned by a system to resources obtained from a cloud computing environment and in which an estimate of the time required to complete the computation task may be updated as the task progresses.

In contrast to the prior art approach, as each new task is received, a determination is made as to the currently available resources which have been allocated by the cloud but are currently inactive (i.e. no task assigned) and the expected times when resources allocated that are active will become available in the immediate future. Where there are sufficient resources available for a submitted task, the resources are appropriately dedicated to the task. Where insufficient resources are available, a new allocation of resources may be obtained. It will be appreciated that the present system is not responsible for the management of the cloud and has no role to play in the operation of the cloud, it merely requests resources 9 (compute instances) from the cloud 8 as required and releases them back to the cloud when no longer required.

To operate efficiently, the present application establishes a number of parameters for each task.

The first parameter employed is one of acceptable waiting time (AWT) which is defined as the time that the system is allowed to queue a computation request before it has to start the computation. By introducing this parameter, the decision is no longer simply one of determining whether a resource is immediately available or whether a new resource is required but instead introduces the possibility of waiting for a resource to become available within the AWT for a received request. It will be appreciated that the AWT may vary from request to request. For example, whilst in a simple implementation, the AWT may be applied uniformly on a system wide basis in more complex implementations, the AWT may be determined on the basis of the individual user submitting the task or indeed for example by the user setting a particular value for the task, e.g. in the web form employed to submit the task to the service. Thus, for example, if the user assigns a particular priority to a computation request, the system may assign a default AWT based on the priority setting.

The use of an AWT allows the resource allocation server 4 to allocate the resources in a way which allows for the completion of computations as quickly as possible (once they have started), by utilizing parallel computing whilst at the same time using the available resources 9 efficiently and economically, by requesting the minimal compute resources 9 required to complete computations in a required time.

The present system 1 performs an initial analysis on a submitted task to determine an initial estimate of the amount of time required to perform the request. Suitably, an algorithm estimates the processing time required based on the input parameters to the computation request. As previously explained, it will be appreciated that the system predefines the available parameters in a request. The values of the parameters may be set by the user.

In the context of the present application, the individual requests contain details of a complex computation to be performed. Each complex computation is prepared in a form known to the system, e.g. in a language or form which may be parsed by the system. For example, the user may be allowed through the web interface 10 to build a mathematical model (equation set) on which to run their data. As this is provided to the system 1 to implement, the system 1 can analyze it to obtain a measure of how long the calculation might take.

Thus for example, where the computation involves a risk assessment calculation to be solved using (2D) Monte Carlo methods, the factors which may be used to determine an estimated running time for each request might include:

Number of Outer Monte Carlo Iterations.
Number of Inner Monte Carlo Iterations (Replications).
Number and types of risk analysis statistics required.
Size of input data.
Compute resources to be used (number of instances and resources per instance).

Thus an estimated time may be determined (calculated) for each computation. The following is an example of the form of the relation between these factors and the expected required running time.

$$ATC = F(N_{outer}, N_{inner}) \times G(\text{Data}) \times H(\text{Assessment Types})$$

where,

F( ) is a function that calculates the complexity due to the number of inner ($N_{inner}$) and outer ($N_{outer}$) Monte Carlo iterations G( ) is a function that calculates the complexity due to the size of the data that needs to be processed H( ) is a function that calculates the complexity due to the number and type of assessment types and statistics required as an output This function gives an estimate of the time required for a computation. Typically, the time required to complete the computation will increase linearly with the total number of iterations completed. The computation becomes more complex as the size of the data set is increased, as this may involve random sampling from a much larger set of data. Also, the time required to complete the calculation will depend on the complexity of the model in question, as this model may need to be used at every iteration of the computation. An algorithm, suitably a non-linear regression fit of these input parameters to data obtained from previous computations is used to estimate the functions, F( ), G( ), and H( ) above.

Suitably, the algorithm is configured to predict the processing time required under different types of compute resource (i.e. different numbers of processors using shared memory, different numbers of multiprocessor servers, etc.) as it will be appreciated, for example, that certain computations may efficiently be shared across processors whilst other computations require the serial processing of the data and thus take more or less the same amount of time irrespective of the number of processors employed.

The main part of the calculation (that consists of the "iterations"), can usually be optimally parallelized, as each iteration is independent. So, the iterations here can be distributed evenly over as many processors as are available, and the speedup is proportional to the number of processors. However, at the start of the assessment, when the calculation is initializing, the servers will need to carry out certain tasks that cannot be distributed—each server will need to carry out the initialization in full. Similarly, at the end of the assessment, the calculation of the statistics cannot be optimally parallelized, as the information on each server needs to be collated and analyzed as a whole. Finally, the transfer of the output data back to the database cannot be parallelized here, as the database server can handle only a limited number of requests at a time. Typically, a single compute server will be responsible for the final global statistics, and the database transfer. The other servers cannot speed up this part of the assessment. Thus it will be appreciated that there are separate estimates of time for initialization, performance of the assessment and finalization.

An exemplary flow is shown for a computation request submitted to the resource allocation server 4, which initially receives the request. In the case of the illustration of FIG. 3, it is assumed that no other request has been received and there are no available resources. Once the request is received, step 30, the AWT is determined for the request, step 32. The AWT value may be contained within the request or it may be retrieved from a value stored in the database, e.g. a value associated with the user submitting the request. As discussed above, the allocation server 4 also determines an initial estimate of the time required to complete the computation, step 34. This estimate along with the AWT for a request is stored in a database along with the time of receipt of the request at the allocation server 4, step 36.

As the request waits in the queue, its effective AWT will be reduced—as the time it has already spent waiting must be taken into consideration. For example, if a request has an AWT of 10 minutes, and has already been waiting 3 minutes, then its effective AWT is 7 minutes. The position of the requests in the queue is determined by this effective AWT—requests are positioned in the queue in order of increasing effective AWT. This ensures that requests are dealt with in an order than maximizes the possibility that all requests begin processing within their respective AWT. The effective AWT is used in the calculation of the Request Queue Length (RQL) as described below.

Figure 3:
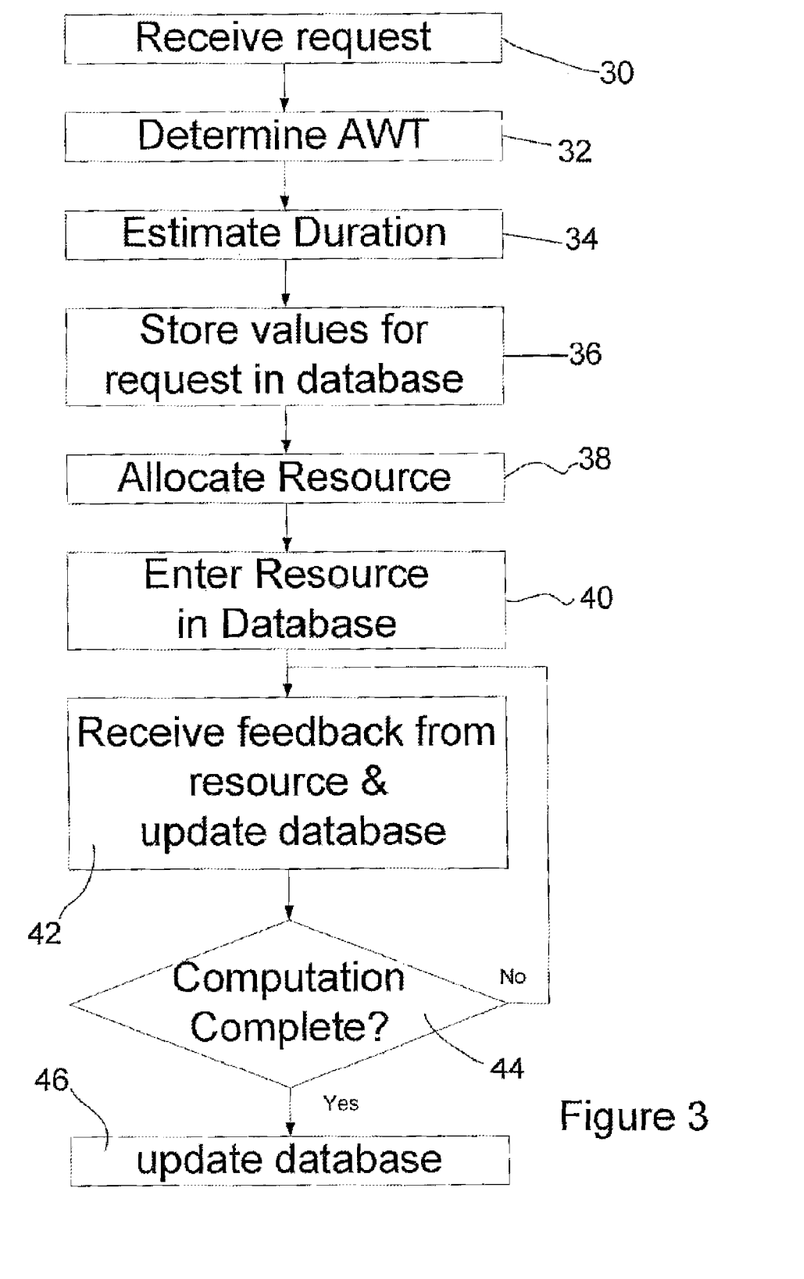
FIG. 3 is an exemplary flow chart for processing a computation request submitted by a user of the system of FIG. 1 or 2.

In the case of FIG. 3, as no resources are available and no other computation requests are present, the allocation server 4 initializes a resource by requesting one or more compute instances 9 from the cloud 8 and setting up the provided compute instance(s) 9—following these steps:

1) The allocation server 4 sends a request to the cloud system 8 for the allocation of a new compute instance 9, step 38. The request is in the form of an API (Application programming interface) call, using any supported API language (e.g. PHP, Python, or Java). The request will specify the type of instance that is required (e.g. the number of processors, the amount of memory etc.).
2) The allocation server 4 waits for the new resource to boot up. This can take a few minutes.
3) The new compute instance 9 must have installed the required software and libraries in order to carry out an assessment. This software can be pre-installed (using a common machine image for each compute instance). Alternatively, the software can be installed once the new compute instance has booted, although it can be appreciated that this method would require more time.
4) Once fully functional, the new compute resource 9 will access the database server (part of the permanent allocation system 6), and will accept the first queued request from this database. The time of initializing the resource and the duration and details of the resource (e.g. numbers of processors etc. . . . ) are stored in the database of the allocation server 4, step 40.
5) This request/assessment will run on the new compute instance 9 (as described below).

The software performing the request on the resource is adapted to maintain the position of the resource within the computation. As the allocation server 4 is effectively in control of the software performing the request, this feature tracking the position of the resource within the computation may readily be included within the software. Thus for computations such as Monte Carlo risk analysis, the progress of the computation through the intensive "iterations" stage may easily be determined by the number of iterations that have been completed, measured relative to the total number of iterations required. For example, if the request involves 5000 iterations, and the software has identified that 2000 are complete, then the progress through this stage is 40%. This value may be employed to determine an accurate value of how much time remains in a computation. For example, if the time to complete 40% was 400 minutes, then the time to complete 100% would be estimated to be 1000 minutes.

In addition to determining an estimate of the time required to complete a computation, the system 1 also regularly determines from each of the allocated resources the remaining time for each request. In contrast to the initial estimate, which may be performed by the server 4 receiving the computation requests from users, the remaining time to completion (ECT) is calculated by the individual resources allocated to the performance of the computation request as explained above. This ECT is regularly fed back by each resource to keep the server 4 allocating the resources updated. As updated values are received they are stored in the database, step 42.

More particularly, a database is employed to keep track of all computations that are running and their statuses. Statistics such as computation percentage completion, time utilized and time estimate to completion are recorded. In particular, the start times of the assessment, the start times of the "iterations" section of the assessment, the total numbers of iterations required, and, the total numbers of iterations completed so far, are recorded in the database. Similarly, once a computation has been completed the database is updated to include the time of completion of the iterative process\start of the finalization process. Once the entire calculation is finished, step 44, the database is updated with a finish time, step 46.

The remaining time may, for example, be estimated for any computation as follows:

$$ECT = T_{overhead} + [T_{utilised} \times (1-f)/f]$$

where, $T_{overhead}$ is any time required to perform finalisation tasks, such as output of results to a database $T_{utilised}$ is the time that has already elapsed during the "iterations" part of the calculation f is the fraction of the total inner iterations that have so far been completed It should be noted here that the ECT is usually more accurate than the ATC, as there is more information available about how quickly the computation will run, once it has started. Also, the ECT is only valid once the computation is in the "iterations" stage—and should not be used until at least some of the iterations have been completed (to ensure the fraction completed is non-zero). It will be appreciated the ECT does not include an initialization value since the ECT is provided once a calculation is in progress and hence the initialization part has been completed.

A further measurement that is employed in the present application is the Available Compute Time ACT, which will now be explained.

Each computing instance obtained from a cloud has to be requested for a minimum request-able time (MRT). For example, for Amazon EC2 the MRT is one hour. This means that if a compute instance is requested for a computation which takes 4 minutes to complete, the computing instance will have 56 further minutes of computational resource available to be utilized by the system. This remaining compute time is defined as available compute time (ACT).

Processing Speed

The system may adjust the processing speed of the job by allocating the appropriate level of computational resource to the analysis.

The present application is particularly well suited to analysis employing parallelized algorithms which can take advantage of multiple processors on multi-processor servers (with shared memory) or on multiple servers. As such a system can take advantage of different numbers of processors. The more processors allocated to the analysis the faster the computation will complete.

For example, it may be estimated that a single computation requested will take 4 hours on a compute instance which has 2 processors (cores). For a system that scales linearly, the same computation would take roughly 1 hour on a compute instance of 8 cores.

Currently, the cost of compute instances is directly related to the compute resources of that instance (the number of cores). Therefore, the cost of a 2-core instance running for 4 hours will be the roughly the same as the cost of an 8-core instance running for 1 hour.

There is greater benefit to the end user if his calculation is completed in 1 hour as opposed to 4 hours. The system will attempt to use an optimal number of processors for each computation. A further refinement of the system is therefore implemented for applications which are designed for parallel processing and that scale close to linearly for multiple processors/servers.

If there are multiple instances currently available (and idle) in the system, all of the available instances to the system from within the cloud are used in the case where this would result in lower overall instance-hours required by the system, i.e. taking into account the request queue length (RQL) and the analysis time of the computation (ATC) in serial and in parallel.

For example, consider a case where there are 4 instances idle with 55 minutes remaining before termination and the Minimum Request-able Time (MRT) is 60 minutes (i.e. one instance-hour). Suppose a computation is submitted which is estimated to take 2 hours (Wall time) to complete on one instance and 30 minutes (Wall time) to complete on 4 instances. The system will run the computation on the 4 instances as this would allow the computation to complete within the existing resources without requiring that any of the instances be extended, or that any additional instances to be created.

It will be appreciated that a key function of the system is the ability to automatically determine when it is necessary to increase and decrease the size of the compute resources being used. More compute resources are required when the processing of requests will take more than the AWT time to begin. Fewer compute resources are required when there are idle compute instances.

There are a number of ways of measuring the "length" of the queue for compute resources. For example, a simple estimator would be the number of requests that are currently waiting in the queue. However, as each request may vary in complexity, this simple estimate may not be good enough. As a result, the measure employed by the system is the time until the last request in the queue will begin to be processed. We can estimate this time using the ECT for each request that is being processed, and the ATC for each request that is in the queue.

To determine the Request Queue Length (RQL), a simulation of the compute cluster, along with the requests queuing and the requests running, is carried out on the resource allocation server 4. This simulation is used to determine whether the requests queuing can all be served within each individual AWT. The calculation of the RQL is calculated for each queuing request, and is carried out as follows:
(Note: The number and type of compute instances is assumed to be constant for this calculation. Together these instances are referred to as the compute cluster)
1) The simulated compute cluster, along with simulated requests queuing and requests running, is initialized on the resource allocation server 4.
2) Each request that is running will have an ECT (which is calculated as above). Each request that is queuing will have an effective AWT, as described above (which is its initial AWT, less any time that the request has already been waiting in the queue). Furthermore, each request that is queuing will have an ATC (based on its input parameters, as above).
3) If there are machines in the compute cluster which are idle (not processing any requests) then the RQL is zero, and the calculation is complete. It will be appreciated that this may only apply where it is possible for an idle machine to continue into the next time slot.
4) If not, then the next available compute machine is determined by finding the minimum ECT, $E_{min}$, of all the requests over all the machines in the simulated compute cluster. Once this request is complete, the next request (the one at the top of the simulated queue) will begin to be processed on that (simulated) machine. The ECT for this request is initialized to be the ATC of the request. The RQL for each queuing request is incremented by the value of the minimal ECT. Each (simulated) running request is moved closer to completion by the value $E_{min}$ (i.e. each simulated ECT is reduced by the value $E_{min}$).
5) Step (4) is repeated until the RQL has been determined for each queuing request. The RQL is then compared to the AWT for each request. If it is found that RQL>AWT for any of the queuing requests, then the simulation will have determined that the expected waiting time of that request is greater than is acceptable. In this case, more compute resources are required to be added to the (real) compute cluster.

If it is found that the current compute cluster is not capable of serving all queuing requests within their respective RQL, then the simulation can be repeated with a larger simulated cluster. In this way, the required size of compute cluster can be determined. (Note: this simulation of the cluster and queuing system can be carried out almost instantaneously—and so we can at any time determine the required compute resources of the "real" system). The calculation of the RQL and subsequent augmentation of the compute cluster is calculated periodically (e.g. every 5 seconds) on the resource allocation server 4. The calculation is not required on each of the other compute instances 9.

Figure 4:
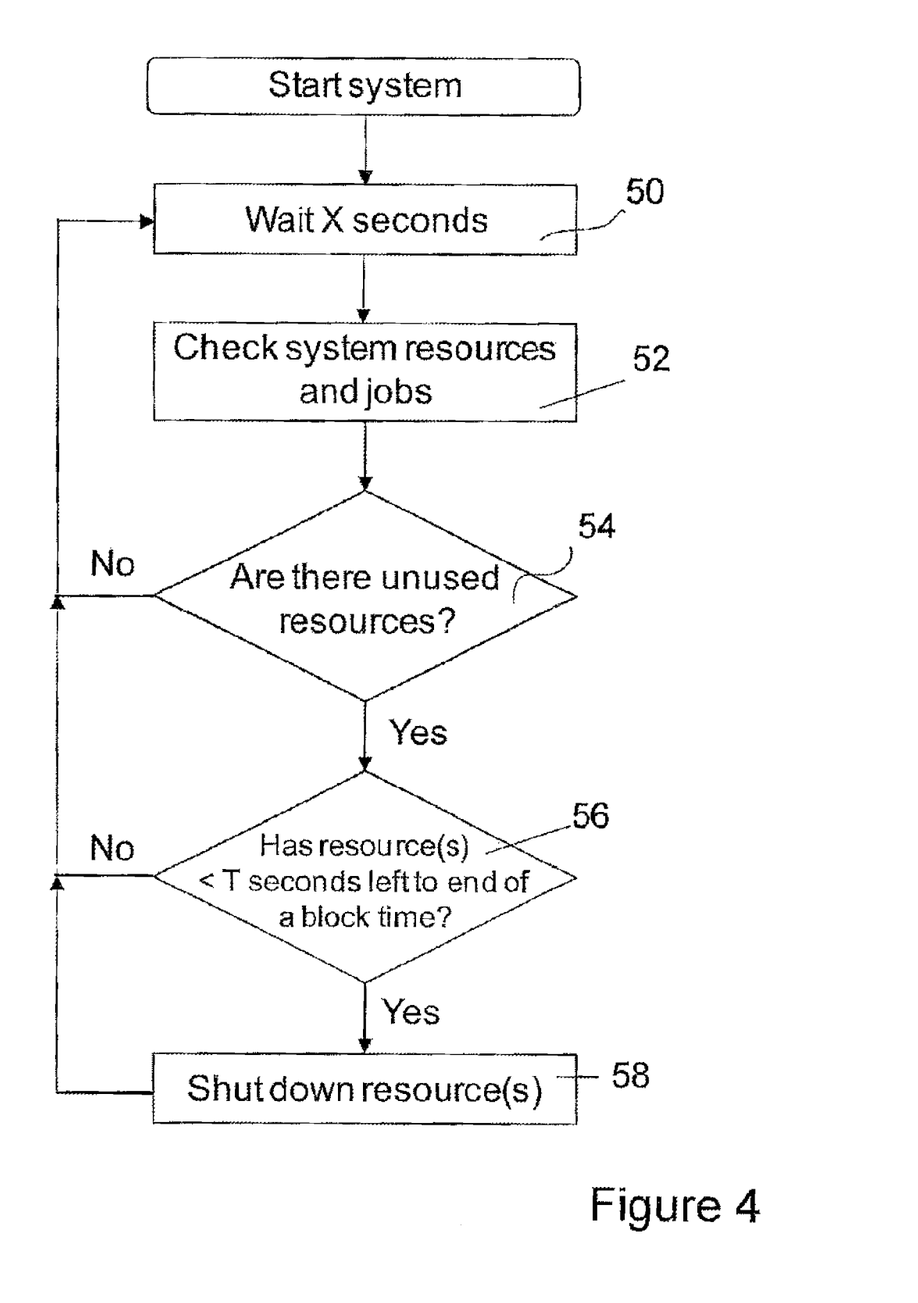
FIG. 4 is an exemplary flow chart of a method for determining when to release resources obtained from a cloud back to the cloud.

The individual compute instances 9 (which are processing the requests) carry out the following procedure, illustrated in FIG. 4, at regular periods (e.g. every 5 seconds, step 50) to allow for the individual compute instances 9 to be returned to the cloud 8:
1) If no request is currently being processed by the instance (i.e. the instance is idle), the request queue is examined, step 52, and the request at the top of the queue is removed from the queue for processing
2) If a resource is not being used, step 54, and there is no request waiting in the queue, a check is made, step 56, to determine whether the instance is within a predefined time (e.g. 120 seconds) of reaching the end of an MRT period—that is ACT<120, then the instance is terminated, step 58. The reason for this MRT period is to ensure that instances are completely shut down before they enter the next billing unit and corresponds to a conservative estimate of how long it takes to terminate an instance. It will be appreciated that this predefined time may be refined over time as a result of measurements.

In this way, the resource allocation server 4 ensures that the correct amount of compute resources 9 are allocated, and each of the individual compute instances ensures that it is always' running computations (as long as there are computations available). No computation will have to wait for more than the AWT before starting, and the amount of time compute resources spend in an idle state is minimized.

Figure 5:
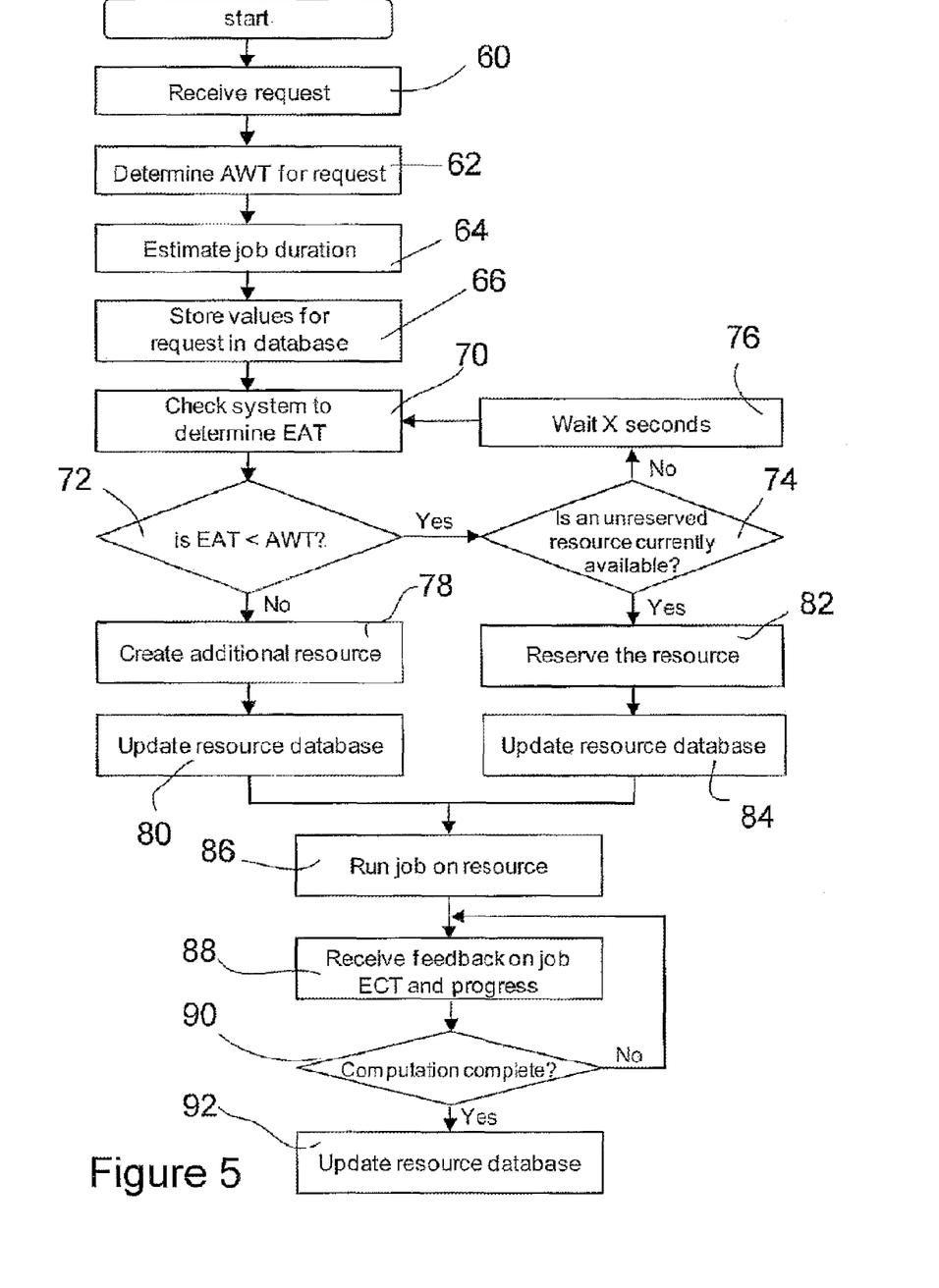
FIG. 5 is a further exemplary flow chart for processing a computation request submitted by a user of the system of FIG. 1 or 2.

The method of operation will now be described in a situation where there are requests currently being processed by the system 1 as shown in FIG. 5. The method commences with the receipt of a request, step 60, from a user for an assessment to be performed. A determination, step 62, as previously described, is then made of the AWT for the submitted request. An estimate is then made, step 64, of the likely time required to complete the submitted assessment. These values are then stored, step 66, in the database. Periodically, a check is made, step 70, to determine if the EAT (i.e. time before a resource become available) is less than the AWT. At step 72, where the EAT is less than the AWT, a check, step 74, is made to determine whether there is an unreserved resource currently available. If there is an unreserved resource available the resource is reserved, step 82, for the request and the database is updated, step 84, to reflect this. Where no resource is available, server 4 waits 76 before again checking the EAT 70. In situations where the EAT falls below the AWT, the server 4 is configured to obtain, step 78, further resources from the cloud 8. The creation of this resource in the system and its allocation to the request is entered 80 in the database. Once a resource has been reserved or created (i.e. obtained from the cloud), the request is run 86 on the allocated resource.

As the job progresses, a feedback element in the resource continually updates the server 4 with feedback, step 88, as long as the task is still progressing, step 90. Once the task is completed, the database is updated, step 92.

Definitions

MRT: minimum request-able time. This is the minimum time a computing instance can be requested on the cloud computing service.

AWT: acceptable waiting time. This is the amount of time for which it is acceptable for a request for compute resource to wait.

ECT: expected completion time. This is the estimated amount of time in seconds until a computation will complete.

ACT: Available compute time. This is the amount of time in seconds that a computing resource has available for computations.

EAT: Expected Availability Time. This is the time in seconds until a compute resource is expected to become available to the system.

EC2: Elastic cloud computing (Amazon cloud computing service), http://aws.amazon.com/ec2/.

RQL: Request Queue Length. The estimated time in seconds until the request will begin to be processed, given the current compute resources allocated.

ATC: Analysis Time of Computations: The estimated time in seconds that a request will need to be fully processed.

Wall time: Real world time (i.e. what the clock on the wall shows), as opposed to the system clock's idea of time. The real world running time of a program.

The system facilitates computations which can be run in parallel over either shared memory or distributed memory systems and whose performance scales close to linearly with multiple processors. The system does not require computations to be run in parallel but, where this is possible the system can perform more efficiently.

Although, the present invention has been described with reference to the service of the present assignee, it will be appreciated that it may be employed with suitable modification in other applications. Accordingly, the present invention, although particularly advantageous in the service provided by the present assignee, is not intended to be limited to this application.

What is claimed is:

1. A system for managing computing resources obtained from a cloud computing environment, the system being configured to allocate one or more computational requests received from one or more users to one or more computing resources of the cloud, the system comprising:

an interface configured to receive the computational requests from the one or more users;

an estimator configured to estimate a time required to perform the received computational request if allocated to a computing resource of the cloud; and a feedback module receiving feedback data from existing resources of the cloud as to their availability, wherein:

an existing computing resource of the cloud is a computing resource of the cloud which has been obtained for an incurred cost for a predetermined time from the cloud and to which a computational request has been assigned, the feedback data including an estimate of a time remaining for each computing resource of the cloud to complete the computational request currently assigned to them, prior to allocation of a received computational request, the system is configured to obtain an acceptable wait time for the received computational request and determine whether the received computational request will have to wait longer than the obtained acceptable wait time before being allocated to a resource of the cloud based on the feedback from the existing resources of the cloud of how long a computation request will have to wait for an existing resource of the cloud to become available to execute the received computational request, the system is further configured to obtain at least one further resource from the cloud based on a positive determination, the system is further configured to allocate the received computational request to the existing resources of the cloud based on a negative determination, and the system is further configured, based on a determination that less than a predetermined time is remaining, to shut down the existing resource of the cloud before the existing resource enters a following billing cycle.

2. The system according to claim 1, wherein the system is configured to allocate resources by placing the received computational request in a queue until an existing resource assigned in the cloud computing environment to the system becomes available.

3. The system according to claim 1, further comprising a database, the database being configured to store the estimates received from resources by the feedback module.

4. The system according to claim 3, wherein the database is configured to also store information regarding the availability of computing resources to the system.

5. The system according to claim 3, wherein the system is further configured to store the determined estimate as the computational request is allocated to a computing resource.

6. The system according to claim 5, wherein data for individual computing resources is updated based on the feedback data received from the feedback module.

7. The system according to claim 1, wherein the estimator is configured to determine the estimate using at least two partial estimates which are aggregated together.

8. The system according to claim 7, wherein the feedback module receives feedback data on each of the partial estimates.

9. The system according to claim 7, wherein one of the partial estimates comprises an initialization estimate, the initialization estimate providing an estimate of the time required to initialize the computing resource to perform the allocated request.

10. The system according to claim 7, wherein one of the partial estimates comprises a finalization estimate, the finalization estimate providing an estimate of the time required, after a computing resource has completed a task, to store resultant data.

11. The system according to claim 7, wherein one of the partial estimates comprises an iteration estimate, wherein the partial estimate for the iteration estimate is calculated by determining a number of iterations required to complete the request and a time required to complete each iteration.

12. The system according to claim 1, wherein the estimator is configured to determine the estimate of the time required to perform the computational request by reference to times taken to complete previous computational requests.

13. The system according to claim 12, wherein the determination of the estimate determines the estimate based on values of identified parameters of the calculation and where the estimate extrapolates the estimate from the values of parameters and the time taken for previous computational requests.

14. A system comprising:
a processor and memory in a cloud computer environment;
an interface in the cloud computer environment configured to receive a plurality of computational requests from a server outside the cloud;
a plurality of existing computing resource instances in the cloud computing environment that have each been obtained for an incurred cost for a predetermined time from the cloud and to which each has been assigned a current computational request, wherein each instance is configured by the server outside the cloud, each instance being configured to perform that instance's current computational request comprising calculations received from the server, wherein each instance is configured to calculate an estimate of the time remaining for performance of that instance's current computational request;
a first feedback module for providing the calculated estimates to the server;
wherein each instance of the cloud computing environment is configurable to perform an additional computational request comprising additional calculations received from the server after that instance has completed that instance's current computational request, and
wherein the system is further configured, based on a determination that less than a predetermined time is remaining, to terminate the existing computing resource instance of the cloud before the existing computing resource instance enters a following billing cycle.

15. The system according to claim 14, wherein each instance is configured to provide the calculated estimates to the server by updating a database associated with the server.

16. The system according to claim 15, wherein each instance is configured when inactive to periodically check the database for an unallocated task.

17. The system according to claim 16, wherein each instance has a predetermined lifetime corresponding to the minimum request-able time for an instance from the cloud and wherein the instance is configured, if there is no unallocated task, to return itself to the cloud when it is within a predetermined time of its lifetime.

18. The system according to claim 17, wherein the lifetime of an instance recommences if it is performing a task at the end of its lifetime.

19. A system comprising:
an instance in a cloud computing environment, where the instance is configured by a server outside the cloud, the instance being configured to perform a task comprising calculations received from the server, wherein the instance is configured to calculate an estimate of the time remaining for performance of the task; and
a first feedback module for providing the calculated estimates to the server, wherein the instance is configured to calculate the estimate as a series of partial estimates, the system further comprising:
an allocator that allocates one or more computational requests received from one or more users to one or more computing resources of the cloud that include the task in the instance;
an interface configured to receive the computational requests from the one or more users;
an estimator configured to estimate the time required to perform the received computational request if allocated to a computing resource; and
a second feedback module receiving feedback data from existing resources of the cloud as to their availability, wherein:
an existing computing resource of the cloud is a computing resource of the cloud which has been obtained for an incurred cost for a predetermined time from the cloud and to which a computational request has been assigned, the feedback data including an estimate of the time remaining for each computing resource of the cloud to complete the computational request currently assigned to them, the estimate including the calculated partial estimates from the first feedback module in the instance,
prior to allocation of a received computational request, the system is configured to obtain an acceptable wait time for the received computational request and determine whether the received computational request will have to wait longer than the obtained acceptable wait time before being allocated to a resource of the cloud based on the feedback from the existing resources of the cloud of how long a computation request will have to wait for an existing resource of the cloud to become available to execute the received computational request,
the system is further configured to obtain at least one further resource from the cloud based on a positive determination,
the system is further configured to allocate the received computational request to the existing resource of the cloud based on a negative determination, and
the system is further configured, based on a determination that less than a predetermined time is remaining, to shut down the existing resource of the cloud before the existing resource enters a following billing cycle.

20. The system according to claim 19, wherein the calculation comprises at least one iterative calculation and the estimate includes an iterative estimate based on a number of iterations performed in a primary loop of said at least one iterative calculation.

21. The system according to claim 19, wherein at least one iterative calculation comprises at least one sub-loop for performing an iterative calculation within each iteration of a primary loop.

22. The system according to claim 20, wherein the iterative estimate is updated as iterations are completed.

* * * * *